United States Patent [19]

Small

[11] Patent Number: 4,616,301
[45] Date of Patent: Oct. 7, 1986

[54] REGULATOR CONTROL SYSTEM

[75] Inventor: Kenneth T. Small, Cupertino, Calif.

[73] Assignee: Boschert Inc., Milpitas, Calif.

[21] Appl. No.: 605,524

[22] Filed: Apr. 30, 1984

[51] Int. Cl.$^4$ ........................................... H02M 3/335
[52] U.S. Cl. ...................................... 363/26; 363/56; 363/97
[58] Field of Search ....................... 363/25, 26, 55, 56, 363/97; 323/285

[56] References Cited

U.S. PATENT DOCUMENTS

| | | | |
|---|---|---|---|
| 4,037,271 | 7/1977 | Keller | 363/21 |
| 4,276,586 | 6/1981 | Boekhorst | 363/21 |
| 4,445,167 | 4/1984 | Okado | 363/56 |
| 4,447,841 | 5/1984 | Kent | 363/56 |
| 4,456,949 | 6/1984 | Incledon | 363/97 |
| 4,459,651 | 7/1984 | Fenter | 363/97 |
| 4,464,709 | 8/1984 | Barter | 363/56 |
| 4,480,300 | 10/1984 | Luursema | 363/97 |

OTHER PUBLICATIONS

Voltage Regulator Data Book, Texas Instruments, 1983, pp. (2-93)-(2-100).
Holland, "Modelling Analysis and Compensation of the Current-Mode Converter", *Proceedings of Powercon II*, Apr. 1984.
Deisch, "Simple Switching Control Method Changes Power Converter into a Current Source", *IEEE Power Electronics Specialist Conference*, 1978.
Spencer, "Designing Switching Voltage Regulators with TL 494", *Texas Instruments Application Report*, CA-198.

*Primary Examiner*—Peter S. Wong
*Assistant Examiner*—Judson H. Jones
*Attorney, Agent, or Firm*—Kenneth E. Leeds; Alan H. MacPherson; Steven F. Caserza

[57] ABSTRACT

A switching power supply for converting an input voltage to a different output voltage includes a power switch for producing a sequence of pulses from the input voltage, an output filter for filtering said pulses and for producing an output voltage from the filtered pulses, and means for sensing the output voltage and for controlling the value of the output voltage to a specified value. The power supply includes means for responding to a reduction in the input voltage beneath a normal value and for increasing the duty cycle of the sequence of pulses from the power switch in response thereto. Structure is provided for automatically controlling the frequency of the sequence of pulses to a selected value and for overriding the automatic control of this frequency so as to decrease this frequency in the event the load connected to the power supply draws too much current. Circuitry is provided to minimize off time in each period of the pulse sequence under "brown-out" conditions.

14 Claims, 4 Drawing Figures

REGULATOR CONTROL SYSTEM

FIELD OF THE INVENTION

This invention relates to power supplies and in particular to a voltage-controlled, current-mode power supply with an improved regulator control system which eliminates oscillations in the widths of the pulses from the power switch in the power supply, improves the brown-out capability of the power supply and eliminates cross-conduction in the power supply.

PRIOR ART

Most control systems for switching power supplies utilize a single control loop that compares the DC output voltage from the power supply to a fixed reference voltage. Any difference or "error" between the two voltages is amplified and used to directly control the pulse width of the power switch in the power supply in a negative feedback arrangement. This produces a regulated (fixed) output voltage. This control method has the following disadvantages:

1. Slow loop response to load current transients;
2. Slow loop response to input voltage changes;
3. Allows certain imbalances in push-pull power switch circuits used in the power supply to cause power switch failure due to excessive current caused by transformer saturation.

FIG. 1 illustrates a typical prior art power supply of this type. In the structure of FIG. 1, the output voltage on lead 12 from the power supply (often called a "converter") is sent to error amplifier 15 on the inverting input lead 17a of error amplifier 15. Voltage reference 18 is applied to the noninverting input lead 17b of error amplifier 15. The output signal on lead 16 from error amplifier 15 reflects the difference between the voltage on output lead 12 and the reference voltage 18 and controls both the duty cycle and width of the pulses produced by pulse width modulator 13 which modulates the input voltage 11. Choke 14 operates in conjunction with capacitor 19 to smooth and average the output pulses from modulator 13.

Improvements over single control loop supplies of the type shown in FIG. 1 have previously been made by adding a second current source loop inside the main voltage loop. FIG. 2 illustrates a typical prior art circuit of this type. The circuit of FIG. 2 includes error amplifier 26 and current sensor 27 as a second loop 30 inside the main voltage loop described above in conjunction with FIG. 1. The error voltage from error amplifier 25 (corresponding to error amplifier 15 in FIG. 1) controls the current source loop 30 which in turn controls the peak switch current from power switch 23 on a cycle by cycle basis. The system including the second loop 30 exhibits much faster response to input and output voltage changes and output current changes. When the power switch 23 is configured as a push-pull circuit, loop 30 corrects for transformer imbalances such as differences in switch transistor storage times, noise and load transients which can cause transformer flux saturation and thus excessive DC current in the switching transistors.

Although the addition of the second current source loop 30 as shown in FIG. 2 improves response speed and balance of the power supply, it adds instability to the pulse widths of the pulses from power switch 23 at greater than 50% switch duty cycles. The duty cycle is the ratio of the on-time of power switch 23 to the total period of the pulses from switch 23. This instability appears as subharmonic oscillations of the pulse widths at a frequency lower than the switching frequency. These oscillations alternately narrow and widen the widths of the pulses from power switch 23. This instability may be stopped by the addition of an artificial ramp to the "switch current sense" waveforms generated by switch current sense circuit 27. This ramp is difficult to generate because it ideally should change magnitude with output load if optimum performance of the power supply over a wide load range is required. The oscillation, which occurs at a submultiple of the switching frequency, is a predictable result of using "clocked-on" controllers (i.e., turning on power switch 23 regularly at a fixed frequency), turning off power switch 23 when the current from switch 23 reaches a predetermined level with duty cycles greater than fifty percent (50%).

Conventional push-pull designs for power switch 23 utilize a minimum off-time of the power switch 23 typically of 2-5 microseconds as a guard band to prevent destructive cross-conduction when the charge storage time of the switching transistors within power switch 23 becomes longer than normal due to device variations, higher temperature, etc. This 2-5 microseconds is wasteful of brown-out capacity (i.e., ability of the power supply to operate with under normal input voltage but the correct output voltage). Reduction of this off-time would result in higher output power at a given peak switch current.

Thus, in the structure of FIG. 2, the output signal from the error amplifier 26 is normally used only to turn off the power switch 23 and not to turn on power switch 23. Power switch 23 is turned on at a regular timed interval using a periodic clocking signal. As is known to those skilled in the art, the periodic turning on of power switch 23 is the cause of the above described oscillations. This is described for example in a paper by Barney Holland entitled "Modeling, Analysis and Compensation of the Current-Mode Converter" published in proceedings of Powercon 11 and given at the Powercon Conference, Apr. 9 through 13, 1984 in Dallas, Tex. This phenomenon is also disclosed by Deisch in a paper entitled "Simple Switching Control Method Changes Power Converter into a Current Source" given at the IEEE Power Electronics Specialist Conference in 1978.

SUMMARY OF THE INVENTION

This invention eliminates the potential for oscillation by not utilizing a "clocked-on" controller, but rather a semi-fixed off time controller. This is accomplished utilizing an industry standard TL494 control integrated circuit manufactured, for example, by Motorola and Texas Instruments, among others.

In accordance with this invention, a third loop is added to the structure of FIG. 2 to hold substantially constant over the long term but to allow to vary over the short term the frequency of the "power switch 23" (which produces a pulse width modulated output signal from a DC input signal) by controlling "off-time".

The phrases "long term" and "short term" are relative phrases. Thus, the phrase "short term" means a few cycles of the switching frequency of power switch 23. Over the long term, absent transients in the load current drawn from the power supply and absent brown out conditions, the switching frequency of power switch 23 is constant. However, over a few cycles of the output pulse from power switch 23 this invention allows the frequency of these output pulses to drop substantially in response to changes in load current drawn from the power supply.

The structure of this invention retains all the advantages of the second current source loop of the structure of FIG. 2 but without the potential for oscillation or the need for an artifical ramp. In addition, load current transient response speed is improved using the structure of this invention because maximum "on-time" of switch 23 will be longer than permitted with a fixed-frequency "clocked" control system during transient load increases. Since only "off-time" is held constant (in the short term) "on-time" can be much longer and allow enough time to reach higher currents required for transient load increases by lowering, although only temporarily, the switching frequency of the power supply. In addition, brown-out capability is improved because the frequency is permitted to drop. This maximizes the on/off ratio or duty cycle of the power supply. In a push-pull power supply the power switch 23 includes a transformer. Transformer core saturation is often not a problem with reduced operating frequency during brown out because the correspondingly reduced input voltage tends to reduce the expected increase in volt seconds across the output transformer due to the lower frequency.

The circuit of this invention also minimizes minimum dead time and automatically prevents cross-conduction of switching transistors (i.e., a momentary simultaneous flow of current through two or more switching transistors) in push-pull converters. Cross-conduction is prevented because turn on of the next switch pulse is delayed until the turn off of the previous pulse is sensed by a control winding in an output filter choke (corresponding to choke 24 in FIG. 2). This makes the delay between the end of the previous pulse and the start of the following pulse minimal and typically less than 1 microsecond. It also makes cross-conduction impossible even if storage times of the push-pull switching transistors become very long.

Other features are provided in accordance with this invention. An automatic frequency control circuit keeps the switching frequency constant by relatively slowly changing off time so that the total period or frequency is constnat. The off time changes slowly enough to prevent any phase shift or gain degradation near the gain crossover point of the voltage loop (which corresponds to the voltage loop in FIG. 2 including error amplifier 25), but changes quickly enough to adjust for input voltage changes. The off time becomes smaller as the input voltage is reduced.

Furthermore, in a push-pull power supply under loadincrease transient conditions, the switch (corresponding to the power switch 23 in FIG. 2) might be on sufficiently long to cause transformer core saturation before the output current reaches the desired value. This is prevented by allowing a control integrated circuit to "time out" (i.e., to run to a maximum value) and switch to the other half cycle (i.e., switch on the other device in the push-pull pair). Similarly, in brown out as the supply goes out of regulation, the on-time increases until the control integrated circuit times out. The combination of minimum off-time and increased on-time extends the brown-out capability of the power supply. The operating frequency may decrease in brown out and with transient loads. When this happens on-time and off-time are not directly related. The current through the power switch (corresponding to switch 23 in FIG. 2) is limited to the desired value by the current control and cannot cause supply damage by transformer saturation under low frequency operation.

This invention will be more fully understood in conjunction with the following detailed description taken together with the attached drawings.

DETAILED DESCRIPTION

While one embodiment of this invention will be described in conjunction with FIG. 3, other embodiments of this invention will be obvious to those skilled in the power supply arts in view of this disclosure.

Figure 3:
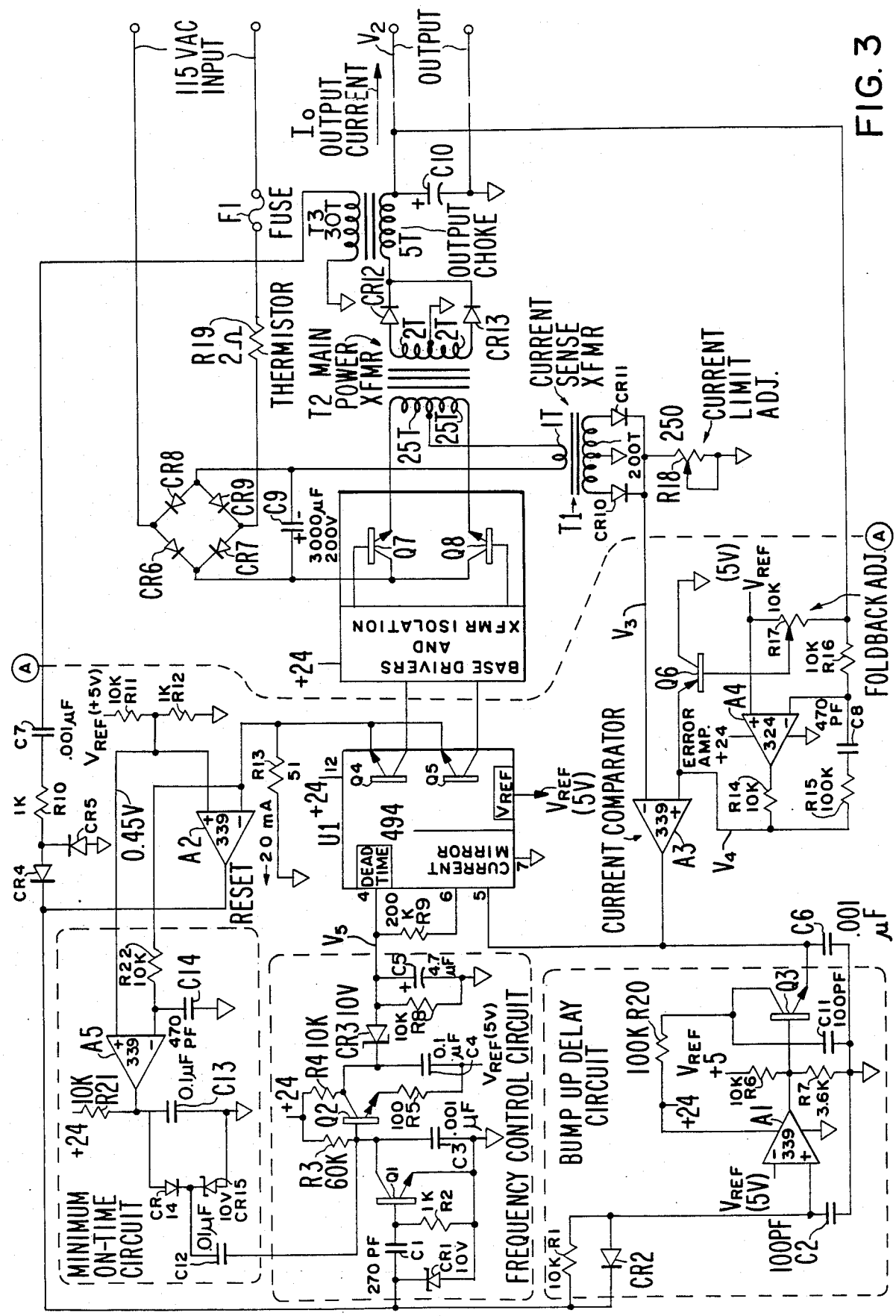
FIG. 3 is a schematic block diagram of the structure of this invention in combination with prior art structure.

In FIG. 3 everything to the right of the dotted line "A—A" is prior art. The input 115 volt AC (V1) is rectified by a full wave bridge comprising diodes CR 6, 7, 8, 9 and charges 3000 $\mu$F 200 volt input capacitor C9. The quasi-square wave voltage from the switching transistors Q7 and Q8 are applied to the primary of a main power transformer T2, the output waveform from the secondary of T2 is rectified by diodes CR 12, 13 and passed through a filter choke T3 to an output capacitor C10 which produces a typical 5 volt output voltage $V_2$. A current sense transformer T1 is connected to sense the current through the primary of the main power transformer T2 and two diodes CR10, CR11 are arranged to rectify the output current from the secondary of the current sense transformer T1. The current is passed through an adjustable 250 ohm resistor R18 referenced to ground thereby generating a voltage $V_3$ proportional to the current in the primary of T2 which is proportional to the output current $I_o$ from the power supply. This voltage $V_3$ is then supplied to a current comparator circuit.

An error voltage $V_4$ is generated by error amplifier A4 by comparing a reference voltage to the output voltage. The error voltage $V_4$ from error amplifier A4 is compared with the voltage $V_3$ in the current comparator A3. During the on-time of Q7, Q8, the T2 primary current eventually reaches the value necessary to trip the current comparator A3. At this time it pulls down pin 5 of the 494 integrated circuit U1 and discharges the 0.001 $\mu$F capacitor C6. This stops the cycle and internally toggles a flip flop in the 494 U1 which alternates turning on and off U1 output transistors Q4 and Q5. Integrated circuit U1 is operated such that when Q4 is on, Q5 is off and vice versa. Q4 and Q5 drive and thus turn on and off switching transistors Q7 and Q8, respectively. The above described circuit provides current mode control and regulation without oscillation. It will not have the oscillation problem associated with other well known clocked-on current mode controllers. However, it lacks the important feature of constant frequency operation. Unfortunately, as the input AC or output DC voltage changes, or as the output load changes, the frequency of switching Q7 and Q8 will change considerably. This is not acceptable and a means is needed to hold the frequency constant. This is accomplished in this invention by the frequency control circuit which adjusts the voltage on pin 4 of U1. Pin 4 is the "dead time" control input to the 494 (U1). The operation of this integrated circuit U1 is described in detail in Texas Instrument Application Report Bulletin CA-198 entitled "Designing Switching Voltage Regulators with TL494" which is hereby incorporated by reference.

The frequency control circuit includes transistor Q1 the base of which receives a submicrosecond pulse every time the switch transistors Q7 or Q8 turn off. This pulse discharges capacitor C3 (0.001 μF). The length of time that is required to charge up capacitor C3 by resistor R3 (60 K ohms) to 5 volts plus 2 diode drops (required by the Darlington transistor Q2) determines the operating frequency at which the peak collector voltage of Q2 will be held at approximately 12 volts. This voltage is adequate to break down the 10 volt zener diode CR3 and charge up capacitor C5 (4.7 μF) to apply voltage V5 to pin 4, the dead time (i.e., "off-time") control on the 494 (U1). Typically voltage V5 is one or two volts. Off-time is the time transistors Q4 and Q5 are both off. The frequency (or period) is determined by the values of R3 and C3 in the frequency control circuit. The frequency control circuit response is slow compared to the unity gain voltage loop frequency. The time constant for the discharge of C5 (4.7 μF) is controlled by R8 (10 K ohms) which, in combination with C5, has a discharge time constant of 47 microseconds. This is slow enough to make the off time appear fixed relative to the faster current loop, and prevent "current mode oscillations" which would otherwise occur at greater than 50% duty cycles. These oscillations are typical in clocked-on pulse width regulation systems. Since this is not a clocked system but rather is controlled by a slowly changing off time, current mode oscillations cannot occur.

Another important feature of switching power supply controllers is to have a minimum guaranteed off-time between the turning off of transistor Q7 (Q8) and the turning on of transistor Q8 (Q7) to prevent cross-conduction overlap of Q7 and Q8 (i.e. current flowing simulataneously through Q7 and Q8) which results in a destructive failure of Q7 and Q8. Usually this is done by putting a fixed minimum voltage on pin 4 of U1 which generates a certain minimum fixed off-time guaranteeing a nonoverlap condition. Since turn off-time of Q7 and Q8 may vary with time, temperature, and normal variations between devices of different lots, it is necessary to design for worst case. Therefore, more than necessary dead time has to be put in so that under worst case conditions dead time never approaches zero. This additional dead time results in a reduction of brown-out capability or operation at low AC input voltages where the maximum possible duty cycle is desired. There is an advantage in having a control circuit which automatically adjusts to minimize off-time as does the circuit of this invention. This is accomplished in this circuit by delaying turn on of one of Q7 and Q8 until the other of Q7 or Q8 turns off. To do this, a winding on the main choke T3 is provided to supply a positive signal to the bump up delay comparator (A1). Since the main choke (T3) cannot supply this signal until after Q7 or Q8 has turned off, waiting for the presence of this signal guarantees sufficient time to allow the next turn on of Q7 or Q8 to take place. Additional dead time, as required by full bridge converters where two transistors must both turn off, is accomplished by resistor R1 (10 K ohms) and capacitor C2 (100 pf) in the "bump-up delay" circuit. When the "bump-up delay" comparator senses that the voltage across capacitor C2 on the noninverting input has reached 5 volts, the comparator output becomes an open circuit allowing resistor R6 (10 K ohms) and resistor R7 (3.6 K ohms) to turn on transistor Q3 which acts as an emitter follower and supplies about 0.7 volts to capacitor C6 and pin 5 of U1. This causes an immediate turn on of Q7 or Q8 when the voltage on pin 4 of U1 is below 0.7 volts. This is the situation under brown out conditions when the pulses from Q4 and Q5 should be at their maximum width and there is need to minimize off-time. For other higher input voltages the voltage on pin 4 produced by the frequency control circuit will always be higher than the voltage on pin 5 preventing the bump up circuit from turning on Q4 or Q5 immediately.

The reset comparator A2 resets the charge to zero on capacitor C2 in the bump up delay circuit and also resets to zero the charge on capacitor C1 (270 pf) that is in the frequency control circuit. This reset is activated whenever Q4 or Q5 in the 494 (U1) turns on. This is accomplished by sensing the 20 milliamp current that flows through the emitters of transistors Q4 and Q5 in the 494 IC (U1) which develops approximately 1 volt across the inverting input of the reset comparator A2. This current originates from the +24 volt supply as it passes through the base drive circuit which limits it to 20 milliamps typical of common proportional base drive circuits. As the AC input voltage V1 is reduced in a "brown-out" situation, the frequency control circuit reduces off time by reducing the voltage on U1 pin 4 in an attempt to hold the frequency constant. At some reduced input AC voltage the voltage on U1 pin 4 will reach a minimum of about 0.7 volts, which is equal to the bump-up voltage supplied by Q3 to C6. As the input AC voltage is further reduced the frequency will begin to drop. This is an advantage in extending the brown-out capability as much as possible by making the fixed minimum dead time an even smaller percentage of the total cycle time as on-time increases. At extremely low input voltages the switching is still guaranteed as the voltage on U1 pin 5 reaches 3 volts and terminates the on pulse. This prevents both a latch-up mode and transformer core saturation which otherwise would result from unlimited on-time of either Q4 or Q5.

Figure 4:
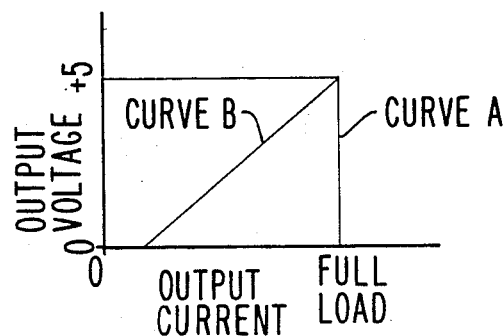
FIG. 4 is a graph of output voltage versus output current for the power supply of FIG. 3 showing the range of output voltage and current characteristics achieved by the structure of FIG. 3.

Limiting output current to a maximum value is needed to protect the supply and load against damage. This is provided by limiting the maximum voltage to the non-inverting input of A3 to 5.6 volts by the clamping action of Q6. This limits the maximum voltage V4 which in turn limits the maximum output current $I_o$ of the power supply. If the foldback adjust R17 wiper is adjusted to the $V_{ref}$ end of R17, the maximum output current will not vary as a function of output voltage (curve A, FIG. 4). If the wiper of R17 is toward the other end of R17, the output current will reduce as the output voltage drops (curve B, FIG. 4). The adjustment of R17 will produce a family of curves between curve A and curve B of FIG. 4. This allows the limiting of output currents under reduced output voltage conditions to a wide range of values to protect the load.

Figure 1:
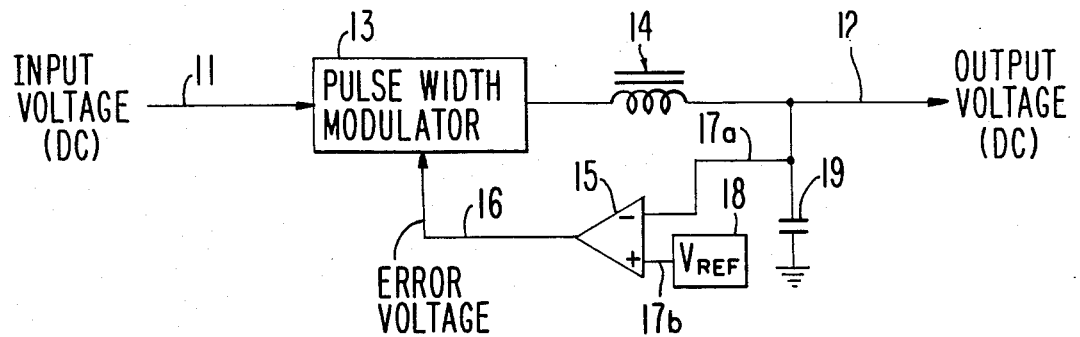
FIGS. 1 and 2 illustrate schematically prior art power supplies.
Figure 2:
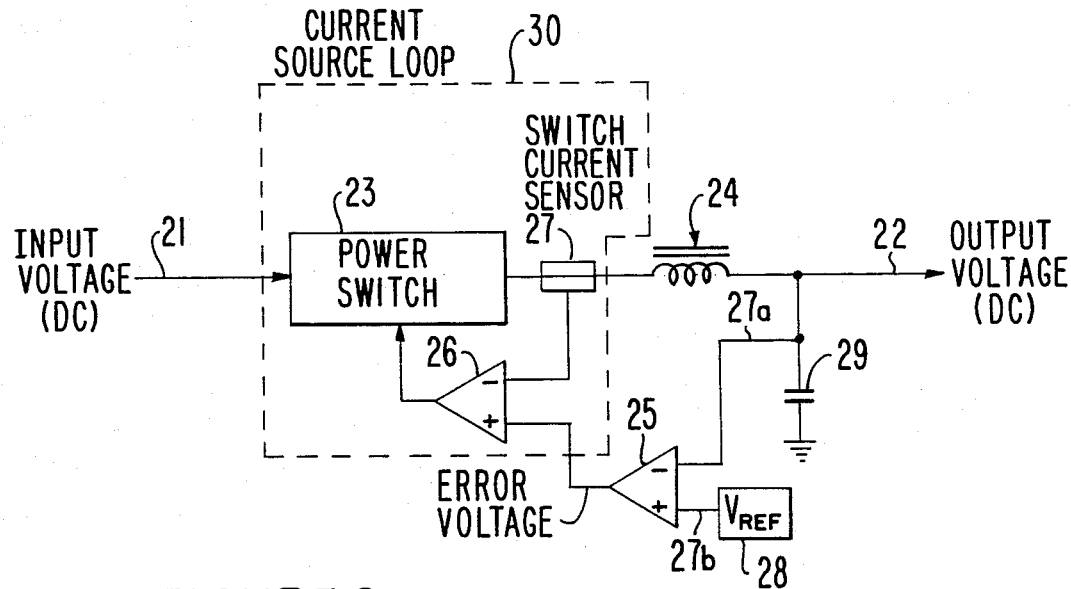

As a feature of the circuit of FIG. 3, under reduced output voltage conditions the duty cycle automatically reduces in order to keep constant volt seconds across the output choke T3. This holds the average output current $I_o$ constant. This requires duty cycles as low as a few percent in situations where there is a large difference between nominal and short circuit output voltage. This will result in excessive output current unless the current source loop (corresponding to loop 30 in FIG. 2) is capable of very short on pulses from transistors Q7 and Q8 (FIG. 3) (corresponding to comparable transistors in power switch 23 in FIG. 2). This requirement leads to excessive cost for very fast devices and other related complications.

The circuit of FIG. 3 includes a minimum on-time circuit which eliminates the need to operate with ultra short on-time. The circuit adds off-time whenever the on-time drops to 5 microseconds. This reduces the duty cycle by adding off-time rather than reducing on-time.

The minimun on-time circuit (FIG. 3) is activated whenever the on pulses from Q4 and Q5 reduce to less than 5 microseconds. This time, of course, is adjustable by changing component values. At this time the integrating network R22 (10 K) and C14 (470 pf) will not produce enough pulse height to cause comparator A5 to discharge capacitor C13 (0.1 $\mu$F) during every on pulse from Q4 or Q5. This results in resistor R21 charging C13 until CR14 and CR15 conduct. When this occurs, capacitor C12 (0.01 $\mu$F) is shunted across C3 (0.001 $\mu$F) in the frequency control circuit. This drops the frequency by up to a factor of 10 or as much as required to hold the minimum on-time greater than 5 microseconds. This eliminates the requirement for ultra short on-times under short circuit (fault) conditions.

What is claimed:

1. A switching power supply for converting an input voltage to a different output voltage comprising:
   a power switch for producing a sequence of pulses and for producing an output voltage therefrom;
   means for sensing said output voltage and for controlling said output voltage to a specified value;
   means for producing a measure of the frequency of said pulses from said power switch and for comparing said measure to a reference voltage; and
   means for varying the off-time of the pulses in said sequence of pulses in response to a deviation in said measure from said reference voltage in order to control said frequency to a selected value.

2. Structure as in claim 1, including means for overriding said means for varying the off-time of the pulses, said means for overriding increasing said off-time per cycle in response to a drop in the output voltage from said power supply due to a load connected to said power supply drawing too much current, said means for overriding reducing the frequency of the sequence of pulses from said power switch.

3. Structure as in claim 1 including
   means for detecting the trailing edge of a pulse from said sequence of pulses, and
   means for turning on the next pulse after a minimum fixed off-time thereby eliminating cross-conduction in said power switch.

4. Structure as in claim 1 including
   means for providing an output current which decreases as the output voltage decreases.

5. Structure as in claim 1 including means for increasing the off-time of said pulses in response to a decrease in the on-time of said pulses below a predetermined minimum.

6. Structure as in claim 5 wherein said means for increasing comprises an integrator integrating a signal during the on-time of said power switch, said integrator providing an integrator output voltage indicative of the on-time of said power switch, said means for increasing extending said off-time of said power switch in response to said integrator output voltage.

7. Structure as in claim 5 wherein said on-time of said pulses decreases in response to a drop in said output voltage of said power supply.

8. Structure as in claim 1 further comprising:
   means for detecting the trailing edge of a pulse in said sequence of pulses; and
   a delay circuit for providing a signal on a delay output lead a fixed time period after said detected trailing edge, said means for varying the off-time ending said off-time in response to said measure of the frequency being below a predetermined minimum and said delay circuit providing said signal on said delay output lead.

9. A switching power supply for converting an input voltage to a different output voltage comprising:
   an output terminal;
   a power switch for producing a sequence of pulses;
   means for receiving said sequence of pulses and producing an output voltage on said output terminal therefrom;
   means for sensing said output voltage and varying the ontime
   of said power switch in response to said output voltage, thereby controlling said output voltage; and
   means for varying the off-time per cycle of said power switch in response to a change in the frequency of said sequence of pulses.

10. Structure as in claim 9 wherein said means for sensing increases the on-time of said power switch in response to a drop in said input voltage, thereby tending to decrease the frequency of said pulses, and said means for varying responds to said decrease in frequency by reducing off-time.

11. Structure as in claim 9 wherein said switching power supply includes a transformer and wherein said means for sensing increases the on-time of said power switch in response to a decrease in input voltage, said means for sensing including means for preventing said transformer from saturating by limiting the amount of time current flows through said transformer during brown-out.

12. A switching power supply comprising:
   an output terminal;
   means for producing a sequence of pulses;
   means for receiving said sequence of pulses and producing an output voltage on said output terminal therefrom;
   means for sensing said output voltage and varying the ontime of said pulses in response to said output voltage, thereby controlling said output voltage; and
   means for providing a measure of the on-time per cycle of said pulses and for varying the off-time per cycle of said pulses in response to said measure without causing a variance in said on-time proportional to the variance in said off-time caused by said means for providing.

13. A switching power supply comprising:
   an output terminal;
   means for producing a sequence of pulses;
   means for receiving said sequence of pulses and producing an output voltage on said output terminal therefrom;
   means for sensing said output voltage and varying the on-time of said pulses in response to said output voltage, thereby controlling said output voltage; and means for providing a measure of the on-time per cycle of said pulses and for varying the off-time per cycle of said pulses wherein said means for providing extends the off-time per cycle of said pulses when said on-time per cycle falls below a predetermined minimum.

14. A power supply comprising:

an output terminal;

a power switch for generating a sequence of pulses;

means for receiving said sequence of pulses and producing an output voltage on said output terminal therefrom;

means for controlling the on-time of said power switch in response to said output voltage of said power supply; and means for varying the off-time of said power switch when said on-time changes such that the frequency of said pulses tends to remain constant, the off-time of said power switch changing over a plurality of switching periods when said on-time changes, thereby preventing an instability in the on-time of said power switch.

* * * * *